United States Patent Office 2,992,069
Patented July 11, 1961

---

2,992,069
METHOD FOR RECOVERING TUNGSTEN TRIOXIDE
Harold M. Hubbard, Wilmington, Del., and Roger W. Sanftner, Des Plaines, Ill., assignors to E. I. du Pont de Nemours and Company, Wilmington, Del., a corporation of Delaware
No Drawing. Filed Jan. 24, 1958, Ser. No. 710,868
19 Claims. (Cl. 23—140)

The present invention relates to a process for extracting and recovering tungsten, in the form of tungsten trioxide, from any of a variety of tungsten-containing ores, ore concentrates, and other tungsten-containing substances in which the tungsten exists as a tungstate and from tungsten carbide, a very hard substance used in cutting tools. More particularly, the present invention relates to a process for extracting tungsten from these tungsten-containing materials involving the use of superheated steam.

Numerous tungsten-bearing ores are known to geologists. Among the more important from a commercial standpoint are ferberite ($FeWO_4$ with lesser amounts of $MnWO_4$), huebnerite ($MnWO_4$ with lesser amounts of $FeWO_4$), wolframite ($FeWO_4$ and $MnWO_4$), reinite ($FeWO_4$), tungstite ($H_2WO_4$), and scheelite ($CaWO_4$).

The prior art discloses a variety of techniques for extracting the tungsten from these and other ores. For example, pulverized wolframite ore has been fused with soda ash to form sodium tungstate which is soluble in water and from which the tungsten can be precipitated (as tungstic acid, $H_2WO_4$) with HCl. By another method, the tungsten-bearing ore is first powdered and then mixed with powdered charcoal. To this mixture is added water, sodium silicate, and powdered sodium nitrate. The resultant composition is then ignited and permitted to burn completely. The soluble tungstate which results is separated from the residue by lixiviation and precipitated with acid. By still another method, complex tungsten ores are treated with aqueous ammonia under elevated pressure and the resultant solution is concentrated whereby the paratungstate crystallizes out. These and a variety of other extraction methods have all met with some degree of success, but all have the disadvantage of being cumbersome and costly.

It is an object of our invention to provide a method for the extraction of tungsten from the aforementioned tungsten-containing materials which is quick and convenient. It is a further object of our invention to provide such a method which is relatively inexpensive and is productive of tungsten in high yields. Other and additional objects will become apparent from a consideration of the ensuing specification and claims.

According to our invention a tungsten ore, ore concentrate, or other tungsten-containing substance in which the tungsten exists as a tungstate, or a portion of tungsten carbide, such as scrap tungsten carbide cutting tools, is treated with superheated steam at elevated temperatures whereby a substantial proportion of the tungsten present, regardless of its initial form, is converted to a volatile tungsten composition. The tungsten is thus separated from the main body of the tungsten-containing material, and is recovered as tungsten trioxide by subsequent cooling of the steam. A more complete understanding of the invention will be gained from the following examples:

Example I 1.1 grams of 60-mesh huebnerite ore concentrate was heated at temperatures of 1025–1075° C. for a period of 4½ hours in the presence of steam. Forty-five percent of the tungsten in the ore concentrate was volatilized and was recovered as tungsten trioxide from the walls of the condenser and the steam condensate. The product recovered was 70% tungsten trioxide. The only major contaminant was silica.

Analysis of the huebnerite ore which was used showed an initial tungsten content of 14.72% (calculated as $WO_3$). The ore contained major amounts of tungsten, silicon, manganese, calcium, and iron; minor amounts of aluminum and titanium; and trace amounts of magnesium and copper.

Example II 2.5 grams of 65-mesh ferberite ore was heated at temperatures of 1040–1075° C. in the presence of steam for a period of five hours. Ninety-eight percent of the tungsten in the ore was volatilized as tungsten trioxide which was recovered from the walls of the condenser and the steam condensate.

Analysis of the ferberite ore which was used showed an initial tungsten content of 12.84% (calculated as $WO_3$). The ore contained major amounts of tungsten, silicon, and iron; minor amounts of aluminum, calcium, strontium, phosphorus manganese, and titanium; and trace amounts of lead, magnesium, copper, and nickel.

Example III 1.2 grams of sodium tungstate was placed in a ceramic boat and heated to 1000° C. in a tube furnace. Superheated steam was blown across the boat at a rate of 2 grams per minute for 100 minutes. After that time, the steam flow was stopped and 0.2 gram of product, identified as 75% tungsten trioxide, was recovered from the apparatus and from the steam condensate.

Example IV 3.8 grams of calcium tungstate was heated at a temperature of 1120° C. in the presence of steam for a period of 5½ hours. Five milligrams of tungsten trioxide was recovered from the steam condensate.

Example V 20.6 grams of tungsten carbide (60 to 80-mesh) was placed in a fluidized bed reactor that was heated by a tube furnace. The furnace was slowly warmed to 900° C. and during this time the sample was blanketed with carbon dioxide gas to prevent contact of the sample with air. When the temperature had reached 900°, superheated steam was run through the reactor at a rate of approximately 3 grams per minute, and the temperature was increased rapidly to 1100° C. These conditions were maintained for two hours. At the end of that time the run was discontinued, and 1.77 grams of volatilized $WO_3$ was recovered from the condensate.

The process of the present invention represents a simple, convenient technique for extracting tungsten from a wide variety of tungsten-containing materials. The process is operable with any tungsten-bearing mineral or other substance in which the tungsten exists as a tungstate, such as a metal mono-, di-, tri-, or higher tungstate, or a paratungstate. The process is also operable for the recovery of tungsten from a tungsten carbide-containing material, such as scrap cutting tools and the like. By subjecting these materials to temperatures of at least about 900°–1100° C. in the presence of steam, the tungsten is volatilized and is recovered from the steam condensate as tungsten trioxide. The precise temperature at which the tungsten commences to volatilize will vary somewhat with the nature of the tungsten-containing starting material. Some tungsten volatilization has been observed to occur from sodium tungstate at temperatures in the range of 950°–980° C. For most of the tungstate-bearing ores and minerals, significant volatilization of the tungsten commences at about 1000°–1100° C. In the case of tungsten carbide, however, tungsten volatilization is in evidence at temperatures as low as 900°–950° C.

There is no suggestion in the literature that elevated temperatures in and of themselves will have any effect on the tungstates or tungsten carbide, as such, with regard to the volatilization of tungsten values. None of the prior art workers have recovered any tungsten from such starting materials by simply subjecting the material directly to a high temperature treatment. Moreover, there are indications in the prior art literature that the presence of substantial amounts of moisture at elevated temperatures will have little or no effect on the volatility of the tungsten values in materials of the aforementioned type. The process of the present invention is thus a significant advance in the art inasmuch as it makes possible the recovery of tungsten from the specified materials by means of a direct volatilization technique at temperatures in the range of 900°–1100° C., or higher.

If metallic tungsten is desired, the tungsten trioxide obtained may be reduced with hydrogen in the well-known manner, as described, for example, in Kirk-Othmer, "Encyclopedia of Chemical Technology," vol. 14, published by the Interscience Encyclopedia, Inc, New York, N.Y. (1935), p. 358.

As used throughout the present specification and claims, the term "tungsten trioxide" is intended to include not only the anhydrous material but the common hydrates thereof as well, such as tungsten trioxide mono- and dihydrate, and the like.

The invention is operable with tungsten carbide as well as with a wide variety of tungsten-containing materials including all of the more common high and low grade tungstate-bearing ores and minerals such as ferberite, huebnerite, wolframite, scheelite, reinite, tungstite, stolzite, raspite, chillagite, cuproscheelite, cuprotungstite, etc. The process is particularly effective with iron and manganese tungstate ores, such as ferberite, huebnerite and wolframite. It is quite likely that the process will find its greatest commercial utilization in connection with the beneficiation of these and related tungsten-bearing ores.

The rate of steam flow and the time for which it is continued are not generally critical to the invention. These values will normally be controlled by economic considerations and will vary widely with the amount and nature of the mineral or material from which the tungsten is being recovered. Generally speaking, the rate of steam flow will be such as to permit good contact between the steam and the tungsten-containing material and the duration of flow will be long enough to accomplish recovery of the tungsten contained in the material in substantial yields.

Having thus described our invention we intend to be limited only by the following claims.

We claim:

1. A method for recovering tungsten values from a tungsten-containing material in which the tungsten exists principally as a compound selected from the class consisting of metal tungstates and tungsten carbide which comprises passing superheated steam over the material at a temperature of at least about 900°–1100° C., cooling the steam, and thereafter recovering tungsten trioxide.

2. A method for obtaining tungsten values from a tungsten-containing material in which the tungsten exists principally as a compound selected from the class consisting of metal tungstates and tungsten carbide which comprises contacting the material with steam at a temperature of a least about 900°–1100° C. whereby a substantial proportion of the tungsten present in the material volatilizes, cooling the steam, and thereafter separating tungsten trioxide from the condensate.

3. In a method for recovering tungsten values from a tungsten-containing material wherein the tungsten exists principally as a compound selected from the class consisting of metal tungstates and tungsten carbide, the essential step of passing superheated steam over the material at a temperature of at least about 900°–1100° C. to separate the tungsten from the material in the vapor state.

4. A method for obtaining tungsten trioxide from a tungsten-containing material in which the tungsten exists principally as a metal tungstate comprising passing superheated steam over the material at a temperature of at least about 900°–1100° C., cooling the steam, and thereafter recovering tungsten trioxide which crystallizes out of the cooled steam.

5. A method as in claim 4 in which the metal tungstate is manganese tungstate.

6. A method as in claim 4 in which the tungstate-containing material is ferberite ore.

7. A method for obtaining tungsten in the form of tungsten trioxide from a material containing ferrous tungstate comprising passing superheated steam over the material at a temperature of at least about 1000° C., cooling the steam, and thereafter recovering tungsten trioxide which crystallizes out of the cooled steam.

8. A method for obtaining tungsten in the form of tungsten trioxide from a material containing manganous tungstate comprising passing superheated steam over the material at a temperature of at least about 1000° C., cooling the steam, and thereafter recovering tungsten trioxide which crystallizes out of the cooled steam.

9. A method of obtaining tungsten trioxide from a tungsten-containing material in which the tungsten exists principally as tungsten carbide comprising passing superheated steam over the material at a temperature of at least about 900° C., cooling the steam, and thereafter recovering tungsten trioxide which crystallizes out of the cooled steam.

10. A method for separating tungsten from a tungsten-containing material in which the tungsten exists principally as a compound selected from the group consisting of metal tungstates and tungsten carbide which comprises passing superheated steam over the material at a temperature of at least about 900°–1100° C. whereby the tungsten in the material volatilizes as tungsten trioxide.

11. A method for separating tungsten from a material containing a metal tungstate which comprises passing superheated steam over the material at a temperature of at least about 900°–1100° C. whereby the tungsten in the material volatilizes as tungsten trioxide.

12. A method as in claim 11 wherein the temperature is at least about 1000° C.

13. A method as in claim 12 wherein the metal tungstate is ferrous tungstate.

14. A method as in claim 12 wherein the metal tungstate is manganous tungstate.

15. A method as in claim 4 in which the tungstate-containing material is huebnerite ore.

16. A method as in claim 4 in which the tungstate-containing material is wolframite ore.

17. A method as in claim 4 in which the tungstate-containing material is ferrous tungstate.

18. A method as in claim 4 in which the tungstate-containing material is calcium tungstate.

19. A method as in claim 4 in which the tungstate-containing material is sodium tungstate.

References Cited in the file of this patent

UNITED STATES PATENTS

| | | |
|---|---|---|
| 1,483,567 | Anjou | Feb. 12, 1924 |
| 1,629,004 | Schwarzkoph | May 17, 1927 |
| 1,800,758 | Schwarzkoph | Apr. 14, 1931 |

OTHER REFERENCES

Mellor: Comprehensive Treatise on Inorganic and Theoretical Chemistry, Longmans, Green and Co., N.Y., 1931, vol. XI, page 683.

Perry: Chemical Engineers Handbook, McGraw-Hill Book Co., Inc., New York, 1941, pages 1387 and 1391.